(12) United States Patent
Versteegh

(10) Patent No.: US 7,550,863 B2
(45) Date of Patent: Jun. 23, 2009

(54) WIND TURBINE

(75) Inventor: Cornelus Johannes Antonius Versteegh, Hilversum (NL)

(73) Assignee: Greenergy India Private Ltd (IN)

( * ) Notice: Subject to any disclaimer, the term of this patent is extended or adjusted under 35 U.S.C. 154(b) by 0 days.

(21) Appl. No.: 12/109,971

(22) Filed: Apr. 25, 2008

(65) Prior Publication Data

US 2008/0272604 A1 Nov. 6, 2008

(30) Foreign Application Priority Data

Apr. 27, 2007 (EP) .................................. 07107167

(51) Int. Cl.
*H02P 9/04* (2006.01)
(52) U.S. Cl. .............................. 290/44; 290/43; 290/54; 290/55
(58) Field of Classification Search .................. 290/43, 290/44, 54, 55
See application file for complete search history.

(56) References Cited

U.S. PATENT DOCUMENTS 4,306,187 A * 12/1981 Kinder ....................... 324/395
6,320,273 B1 * 11/2001 Nemec ......................... 290/55
7,230,347 B2 * 6/2007 Brown et al. .................. 290/55

FOREIGN PATENT DOCUMENTS

| EP | 1045139 A2 | 10/2000 |
|---|---|---|
| EP | 1138966 A1 | 10/2001 |
| EP | 1457673 A1 | 9/2004 |
| EP | 1596064 A2 | 11/2005 |

OTHER PUBLICATIONS

European Search Report, EP07107167, Dec. 11, 2007, 2 pages.

* cited by examiner

*Primary Examiner*—Nicholas Ponomarenko
*Assistant Examiner*—Iraj A Mohandesi
(74) *Attorney, Agent, or Firm*—St. Onge Steward Johnston & Reens LLC

(57) ABSTRACT

The invention concerns a wind turbine comprising a vertical tower with a yaw bearing, a nacelle on top of the yaw bearing, a hub with blades rotatable around a more or less horizontal rotation axis. The nacelle has a generator and a control room, whereby the generator comprises a rotor with a rotor shaft supported on two rotor bearings carrying the hub, and a stator comprising a cylindrical outer shell with a stator diameter that is approximately equal to the diameter of the nacelle and which outer shell has at its ends a front cover plate and a back cover plate each with a rotor bearing for supporting the rotor shaft. In accordance with the invention the rotor shaft is hollow and the hollow hub is accessible from the control room through the hollow rotor shaft.

11 Claims, 2 Drawing Sheets

WIND TURBINE

CROSS-REFERENCE TO RELATED APPLICATIONS

The present application claims priority from European patent application no. 07107167, filed Apr. 27, 2007, the content of which is incorporated herein by reference.

FIELD OF THE INVENTION

The invention concerns a wind turbine comprising a vertical tower with a yaw bearing (22), a nacelle (29) on top of the yaw bearing, a hub (3) with blades (5) rotatable around a more or less horizontal rotation axis (33), the nacelle comprising a generator and a control room (15), whereby the generator comprises a rotor (27) with a rotor shaft (32) supported on two rotor bearings (17,31) carrying the hub, and a stator (11) comprising a cylindrical outer shell with a stator diameter that is approximately equal to the diameter of the nacelle and which outer shell has at its ends a front cover plate (7) and a back cover plate (18) each with a rotor bearing for supporting the rotor shaft characterized in that the rotor shaft (32) is hollow and the hollow hub (3) is accessible from the control room (15) through the hollow rotor shaft.

BACKGROUND OF THE INVENTION

Such a wind turbine is known. The disadvantage of the known wind turbine is that the access to the hub is dangerous as the access path to the hub is either outside the nacelle which is dangerous dependent on the weather conditions or through the generator which is dangerous due to the proximity of high tension electrical cables.

SUMMARY OF THE INVENTION

In order to overcome this disadvantage the wind turbine comprises a vertical tower with a yaw bearing (22), a nacelle (29) on top of the yaw bearing, a hub (3) with blades (5) rotatable around a more or less horizontal rotation axis (33), the nacelle comprising a generator and a control room (15), whereby the generator comprises a rotor (27) with a rotor shaft (32) supported on two rotor bearings (17,31) carrying the hub, and a stator (11) comprising a cylindrical outer shell with a stator diameter that is approximately equal to the diameter of the nacelle and which outer shell has at its ends a front cover plate (7) and a back cover plate (18) each with a rotor bearing for supporting the rotor shaft characterized in that the rotor shaft (32) is hollow and the hollow hub (3) is accessible from the control room (15) through the hollow rotor shaft. By creating an access path through the rotor shaft to the inside of the hollow hub the operators have easy and safe access to the hub, while avoiding the high tension area of the generator.

In accordance with an embodiment the wind turbine further comprises a cylindrical outer shell (9) that forms part of the outer surface of the nacelle (29) and directly connects to a circumference of a vertical drum (24) supported on the yaw bearing (22). In this way the vertical drum supports the outer shell and the rotor in a direct way whereby the ambient air cools the cylindrical outer shell which is part of the stator of the generator.

In accordance with an embodiment the wind turbine comprises a distance between the two rotor bearings (17,31) that is at least the diameter of the vertical drum (24). In this way the generator is direct above the yaw bearing so that its weight which is a major part of its load does not lead to a concentrated and/or asymmetric load on the yaw bearing.

In accordance with an embodiment the wind turbine comprises a passage (20) that connects a first opening (21) in the side of the vertical drum (24) with a second opening (36) in a floor of the control room (15). In this way the control room can be directly and safely accessed from the tower.

In accordance with an embodiment the wind turbine comprises a front cover plate (7) between the generator and the hollow hub (3) that has a front bearing (31) and at its outer circumference a connection flange (8) for connecting it to the cylindrical outer shell (9) whereby the distance between the plane of the front bearing and the plane of the connection flange is at least 0.15 times the diameter of the connection flange. In this way the front cover plate is sufficiently stiff to withstand with minimal deformation the axial forces generated by the blades.

In accordance with an embodiment the wind turbine comprises a front cover plate (7) that has a conical shape. In this way the front cover plate can have a reduced weight.

In accordance with an embodiment the wind turbine comprises a front bearing (31) that has a bearing diameter which is at least 0.40 times the diameter of the connection flange (8). In this way the bearing is sufficiently stiff for supporting the hub with blades and maintaining a constant gap between the rotor and the stator.

In accordance with an embodiment the wind turbine comprises a front bearing (31) that has a bearing diameter which is between 0.40 times and 0.70 times the diameter of the connection flange (8). In this way the first bearing is sufficiently stiff while its diameter is not too large, so that the costs of the bearing remain reasonable.

In accordance with an embodiment the wind turbine comprises a cylindrical outer shell (9) and if applicable a vertical connection flange (28) connecting the cylindrical outer shell to the vertical drum (24) are from cast metal. In this way a light and strong construction of the generator can be made.

In accordance with an embodiment the wind turbine comprises a cylindrical outer shell (9) that has cooling fins (37) for cooling the stator (11). In this way transmitting the heat of the stator to the ambient air is arranged in an easy way.

In accordance with an embodiment the wind turbine comprises a generator that has a cable connection box (34) for connection the generator to cables in the tower whereby the cable connection box is under the nacelle (29) in the vertical drum (24). In this way the cables can connect directly to the connection box in the tower and need not to be guided into the nacelle.

BRIEF DESCRIPTION OF THE DRAWINGS

Hereafter the invention is explained in more detail by describing an embodiment of a wind turbine with the aid of a drawing in which.

DETAILED DESCRIPTION OF THE INVENTION

Figure 1:
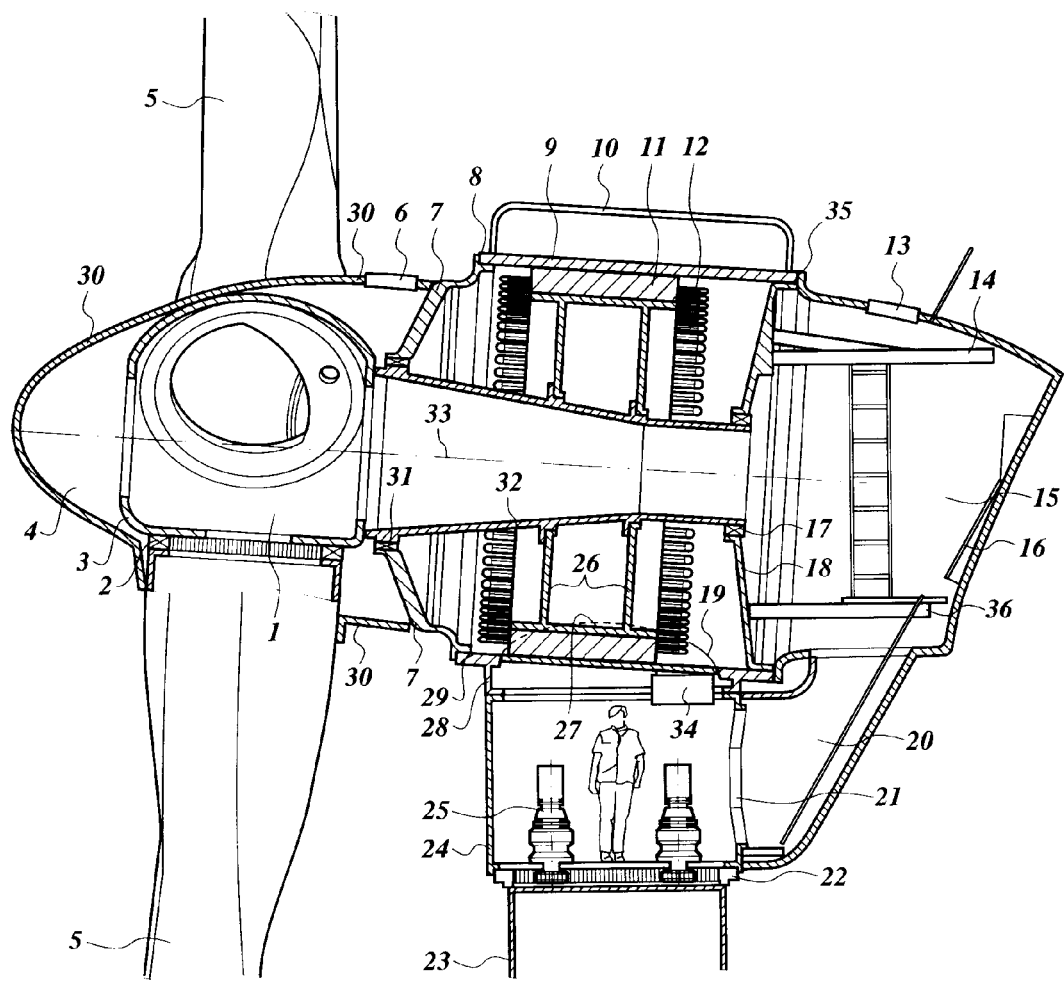
FIG. 1 shows a schematic section of the top of a tower with a nacelle of a wind turbine.
Figure 2:
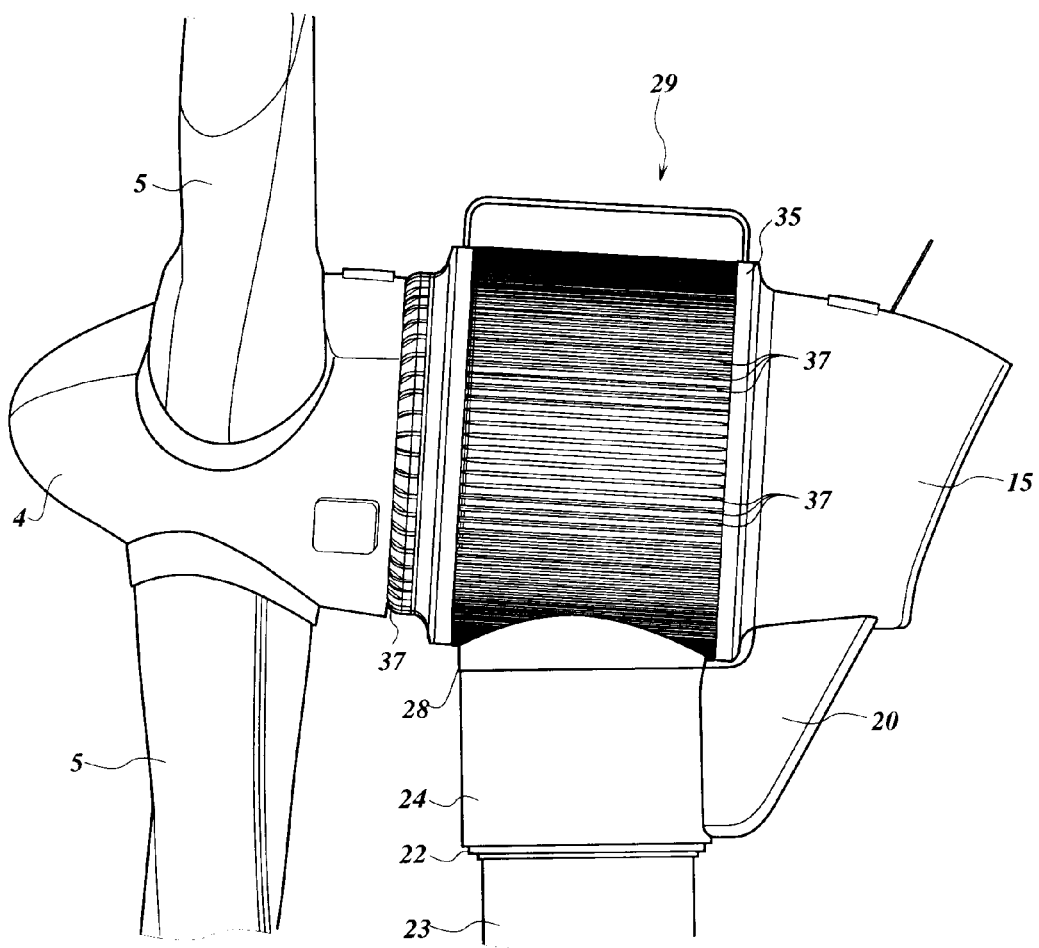
FIG. 2 shows a side view of the nacelle of the wind turbine.

A yaw bearing 22 is mounted on a tower 23. In the shown embodiment the tower 23 is a cylindrical or slightly conical pipe which is mounted on a foundation. The tower 23 can have different shapes such as a truss. The yaw bearing 22 supports a cylindrical shell 24 which is coupled via a connecting flange 28 to an outer shell 9 of a nacelle 29. The cylindrical shell 24 has a height of approximately 2 meter, so that above the yaw bearing 22 there is sufficient room for an operator to stand. In the cylindrical shell 24 a yaw drive 25 is mounted on gear teeth that are part of the yaw bearing 22 for rotating the nacelle 29 so that a rotation axis 33 of a hub 3 with blades 5 can be directed in the direction of the wind that drives the blades 5 of the wind turbine. The cylindrical shell 24 and/or the connecting flange 28 have a diameter that is more than 50% or approximately 60% of the diameter of the outer shell 9, so that the cylindrical shell 24 and/or the connecting flange 28 stiffen the outer shell 9 considerably and ensure its roundness.

The outer shell 9 together with the connecting flange 28 can be made in one piece from cast metal, such as cast steel. It can be advantageous to cast this piece in such a way that inside the connecting flange 28 there is a partial or full opening instead of the cylindrical wall of the outer shell 9. In that case preferably a plate 19 is welded or mounted in this opening to make a separation between the room under the nacelle 29 and the inside of the generator. It is then easier to insulate the inside of the generator from the ambient air, which is especially advantageous when the wind turbine is located at or in the sea. In another embodiment instead of the connecting flange 28 and the outer shell 9 being made from a casting they can be welded from plate or pipe material.

The outer shell 9 forms the outside of the nacelle 29 and is part of the generator as immediately at the inside of the outer shell 9 stator plates 11 with stator windings 12 are mounted. As a result of generating electricity the generator will also generate heat in the stator plates 11 and/or the stator windings 12, which heat has to be removed. For this reason the stator plates 11 are immediately against the outer shell 9 and preferably the outer shell 9 is on its outside provided with cooling fins 37 which are cooled by the ambient air.

The front end of the outer shell 9 is connected with a front flange connection 8 to a front cover 7. The front cover 7 may have on its outside surface cooling fins 37. A front bearing 31 is mounted in the front cover 7. Preferably the front cover 7 is more or less conical, so that the axial forces from the blades 5 are directed in a direct way with little deformation to the outer shell 9 and from there via the vertical connection flange 28 to the cylindrical wall 24 and the yaw bearing 22. The hind end of the outer shell 9 is connected by a hind flange connection 35 to a hind cover 18. A hind bearing 17 is mounted in the hind cover 18. A hollow shaft 32 with the rotation axis 33 is mounted in the front bearing 31 and the hind bearing 17. The generator is designed such that its center of gravity, which is mainly determined by the weight of the stator windings 12, is within the outer circumference of the yaw bearing 22. Preferably the front bearing 31 and the hind bearing 17 have a considerable distance, for instance at least the diameter of the yaw bearing 22. The front bearing 31 is preferably in front of the circumference of the yaw bearing 22 and if possible the hind bearing 17 is on the other side of the outer circumference of the yaw bearing 22.

Two flanges 26 connect a rotor 27 to the hollow shaft 32. The rotor 27 rotates with the hollow shaft 32 and the blades 5 and has on its outside circumference permanent magnets (not shown) that interact with the stator windings 12 to generate electrical power in cables of the stator windings 12. The cables of the stator windings 12 are guided through an opening (not shown) in the bottom of the outer shell 9 or in the plate 19 to a connection box 34 which is located in the cylindrical shell 24. A cable connecting the connection box 34 with a converter for converting the generated Alternating Current into Direct Current or connecting it to other connections hangs from the connection box 34 through an opening in the yaw bearing 22 so that the nacelle 29 can rotate freely.

At the front end of the outer shell 9 the hollow hub 3 is coupled to the hollow shaft 32. At the hind end of the outer shell 9 the nacelle 29 has a control room 15 of which the outside extends more or less in line with the outside surface of the outer shell 9. The control room 15 is accessible from the cylindrical shell 24 via an opening 21 in the wall of the cylindrical shell 24 and a passage 20 which connects the cylindrical shell 24 and an opening 36 in the floor of the control room 15. The control room 15 has a hoist rail 14 on which a hoist (not shown) can slide. The wall that faces away from the generator has a hatch 16, which is inclined and partly under the hoist rail 14 so that parts can be lowered down from or hoisted up into the control room 15 through the hatch 16.

The hollow hub 3 has a hub room 1 which is accessible from the control room 15 through the hollow shaft 32. The blades 5 are attached to the hub 3 with a blade bearing 2 and there is a blade drive (not shown) for changing the pitch of the blades. For reducing the flow resistance in the wind the hub 3 is encompassed by a cover 30 which has a nose 4. An operator can access the hub room 1 through the hollow shaft 32 in an easy way for maintenance of the inside of the blades 5 and the blade drives that are accessible from the hub room 1. Thereby the operator reaches the hub room 1 without crossing the inside of the generator and does not get near the high tension wiring of the stator windings 12. Also he keeps free of the cables that hang down from the connection box 34 in the tower 23. For maintenance of the outside of the hub 3 and the roots of the blades 5 the hub 3 can be accessed via a hatch 13 in the roof of the control room 15 and a path formed by a railing 10 over the top surface of the outer shell 9. A hatch 6 in a protective cover 30 makes access of the inside of the cover 30 and the outside of the hub 3 and the roots of the blades 5 possible.

What is claimed is:

1. Wind turbine comprising a vertical tower with a yaw bearing, a nacelle on top of the yaw bearing, a hub with blades rotatable around a more or less horizontal rotation axis, the nacelle comprising a generator and a control room, whereby the generator comprises a rotor with a rotor shaft supported on two rotor bearings carrying the hub, and a stator comprising a cylindrical outer shell with a stator diameter that is approximately equal to the diameter of the nacelle and which outer shell has at its ends a front cover plate and a back cover plate each with a rotor bearing for supporting the rotor shaft characterized in that the rotor shaft is hollow and the hollow hub is accessible from the control room through the hollow rotor shaft.

2. Wind turbine according to claim 1 whereby the cylindrical outer shell forms part of the outer surface of the nacelle and directly connects to a circumference of a vertical drum supported on the yaw bearing.

3. Wind turbine according to claim 2 whereby the distance between the two rotor bearings is at least the diameter of the vertical drum.

4. Wind turbine according to claim 1, whereby a passage connects a first opening in the side of the vertical drum with a second opening in a floor of the control room.

5. Wind turbine according to claim 1 whereby the front cover plate between the generator and the hollow hub has a front bearing and at its outer circumference a connection flange for connecting it to the cylindrical outer shell whereby the distance between the plane of the front bearing and the plane of the connection flange is at least 0.15 times the diameter of the connection flange.

6. Wind turbine according to claim 5 whereby the front cover plate has a conical shape.

7. Wind turbine according to claim 5 whereby the front bearing has a bearing diameter which is at least 0.40 times the diameter of the connection flange.

8. Wind turbine according to claim 5 whereby the front bearing has a bearing diameter which is between 0.40 times and 0.70 times the diameter of the connection flange.

9. Wind turbine according to claim 1 whereby the cylindrical outer shell and if applicable a vertical connection flange connecting the cylindrical outer shell to the vertical drum are from cast metal.

10. Wind turbine according to claim 1 whereby the cylindrical outer shell has cooling fins for cooling the stator.

11. Wind turbine according to claim 1 whereby the generator has a cable connection box for connection the generator to cables in the tower whereby the cable connection box is under the nacelle in the vertical drum.

* * * * *